United States Patent
Liao et al.

(10) Patent No.: US 10,742,390 B2
(45) Date of Patent: Aug. 11, 2020

(54) METHOD OF IMPROVING CLOCK RECOVERY AND RELATED DEVICE

(71) Applicant: NOVATEK Microelectronics Corp., Hsin-Chu (TW)

(72) Inventors: Jen-Hao Liao, Hsinchu County (TW); Yu-Hsun Peng, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/627,367

(22) Filed: Jun. 19, 2017

(65) Prior Publication Data

US 2018/0019863 A1    Jan. 18, 2018

Related U.S. Application Data

(60) Provisional application No. 62/361,503, filed on Jul. 13, 2016.

(51) Int. Cl.

| H04L 7/033 | (2006.01) |
|---|---|
| H04L 25/14 | (2006.01) |
| H04L 7/04 | (2006.01) |
| G06F 13/42 | (2006.01) |
| H04L 25/49 | (2006.01) |
| H04L 7/00 | (2006.01) |

(52) U.S. Cl.
CPC .......... *H04L 7/033* (2013.01); *G06F 13/4278* (2013.01); *H04L 7/0087* (2013.01); *H04L 7/04* (2013.01); *H04L 25/14* (2013.01); *H04L 25/4917* (2013.01); *H04L 7/0037* (2013.01); *H04L 7/0331* (2013.01)

(58) Field of Classification Search
CPC ...... H04L 7/0087; H04L 7/033; H04W 56/00; H04N 19/164; H04N 19/166; H04N 19/89; H04N 21/4302; G09G 5/12; G06F 3/14; G06F 1/324; G06F 1/3218; G06F 3/1415
See application file for complete search history.

(56) References Cited

U.S. PATENT DOCUMENTS

| 5,182,761 A * | 1/1993 | Beyer .................. H04L 7/0331 375/373 |
|---|---|---|
| 6,249,896 B1 * | 6/2001 | Ho ..................... G11B 20/1813 714/798 |
| 6,697,337 B1 * | 2/2004 | Cafarelli ................. H04L 43/00 370/224 |
| 6,732,204 B2 * | 5/2004 | Ishida ................. G06F 13/4059 370/505 |

(Continued)

FOREIGN PATENT DOCUMENTS

| CN | 102752097 A | * 10/2012 | ........... H04L 7/0334 |
|---|---|---|---|
| CN | 102752097 A | 10/2012 | |
| CN | 102752097 B | * 12/2014 | ............. H04L 7/046 |

*Primary Examiner* — Berhanu Tadese
(74) *Attorney, Agent, or Firm* — Winston Hsu

(57) ABSTRACT

A method for a Mobile Industry Processor Interface (MIPI) master device for improving clock recovery at a MIPI slave device includes: transmitting a symbol sequence including a plurality of consecutive symbols which include at least one of a first symbol value and a second symbol value to the MIPI slave device prior to transmitting packet data to the MIPI slave device, wherein the first symbol value and the second symbol value bring relatively larger encoding jitters than other symbol values.

20 Claims, 12 Drawing Sheets

(56) References Cited

U.S. PATENT DOCUMENTS

| | | | | |
|---|---|---|---|---|
| 7,190,284 B1* | 3/2007 | Dye | G06F 12/023 | 341/51 |
| 7,443,319 B2* | 10/2008 | Schwartz | H03M 5/145 | 341/50 |
| 7,535,957 B2* | 5/2009 | Ozawa | H03L 7/087 | 348/530 |
| 7,795,936 B2* | 9/2010 | Kim | H03L 7/0812 | 327/149 |
| 8,121,186 B2* | 2/2012 | Chmelar | H03M 1/002 | 375/233 |
| 8,305,244 B2* | 11/2012 | Said | H03M 7/30 | 341/107 |
| 8,400,197 B2* | 3/2013 | Romano | H03L 7/07 | 327/156 |
| 8,781,051 B2* | 7/2014 | Ciacci | H04L 7/0334 | 375/325 |
| 9,000,815 B2* | 4/2015 | Romano | H03L 7/07 | 327/156 |
| 9,148,198 B1* | 9/2015 | Zhang | H04L 25/0264 | |
| 9,397,647 B2* | 7/2016 | Romano | H03K 5/131 | |
| 9,407,424 B1* | 8/2016 | Holla | H04L 7/0337 | |
| 9,485,080 B1* | 11/2016 | Duan | H04L 5/0048 | |
| 9,496,879 B1* | 11/2016 | Duan | H04L 7/0087 | |
| 9,548,876 B2* | 1/2017 | Tseng | H04L 25/0278 | |
| 9,553,635 B1* | 1/2017 | Sejpal | H04B 3/54 | |
| 9,832,094 B2* | 11/2017 | Wiley | H04B 3/462 | |
| 9,866,413 B2* | 1/2018 | Chang | H04L 25/493 | |
| 9,939,881 B2* | 4/2018 | Sinha | H04W 52/0251 | |
| 10,128,964 B2* | 11/2018 | Wiley | G06F 13/4295 | |
| 2003/0039326 A1* | 2/2003 | Hall | G06F 13/4072 | 375/348 |
| 2007/0273402 A1* | 11/2007 | Zethmayr | H04L 25/0278 | 326/30 |
| 2009/0015304 A1* | 1/2009 | Yin | H03L 7/06 | 327/162 |
| 2009/0028281 A1* | 1/2009 | Chulwoo | G06F 13/385 | 375/374 |
| 2009/0222603 A1* | 9/2009 | Den Besten | G06F 13/4291 | 710/106 |
| 2009/0241006 A1* | 9/2009 | Liikanen | H04L 1/0041 | 714/752 |
| 2010/0067633 A1* | 3/2010 | Den Besten | H03L 7/10 | 375/373 |
| 2010/0091921 A1* | 4/2010 | Den Besten | H03L 7/189 | 375/354 |
| 2012/0025880 A1* | 2/2012 | Romano | H03L 7/07 | 327/156 |
| 2012/0288044 A1* | 11/2012 | Roberts | G06F 1/022 | 375/350 |
| 2012/0314100 A1* | 12/2012 | Frank | H04N 5/35554 | 348/229.1 |
| 2013/0101075 A1* | 4/2013 | Helmschmidt | H04L 7/042 | 375/355 |
| 2013/0113534 A1* | 5/2013 | Wachi | H03L 7/091 | 327/148 |
| 2013/0200933 A1* | 8/2013 | Romano | H03L 7/07 | 327/158 |
| 2013/0201288 A1* | 8/2013 | Billerbeck | G01S 17/89 | 348/46 |
| 2014/0056337 A1* | 2/2014 | Kesling | H04B 1/38 | 375/219 |
| 2014/0085353 A1* | 3/2014 | Yokonuma | G06F 11/221 | 345/690 |
| 2014/0126566 A1* | 5/2014 | Chen | H04W 56/00 | 370/350 |
| 2014/0310566 A1* | 10/2014 | Balakrishnan | H04L 7/0029 | 714/748 |
| 2014/0348214 A1* | 11/2014 | Sengoku | H04L 7/04 | 375/147 |
| 2014/0369366 A1* | 12/2014 | Blon | H04L 7/10 | 370/514 |
| 2015/0030112 A1* | 1/2015 | Wiley | H04L 7/033 | 375/360 |
| 2015/0035576 A1* | 2/2015 | Romano | H03K 5/131 | 327/262 |
| 2015/0271037 A1* | 9/2015 | Wiley | H04B 3/462 | 370/252 |
| 2015/0278138 A1* | 10/2015 | Seidel | G06F 13/405 | 714/800 |
| 2015/0350504 A1* | 12/2015 | Corcoran | H04N 5/2254 | 348/211.99 |
| 2016/0112611 A1* | 4/2016 | Isaac-Lowry | H04N 5/92 | 348/207.1 |
| 2016/0179746 A1* | 6/2016 | Hein | G06F 13/4291 | 710/105 |
| 2016/0282921 A1* | 9/2016 | Kodavalla | G06F 1/324 | |
| 2016/0301422 A1* | 10/2016 | Ahmed | H03M 5/145 | |
| 2016/0301426 A1* | 10/2016 | Ahmed | H03M 7/04 | |
| 2016/0330048 A1* | 11/2016 | Tseng | H04L 25/0278 | |
| 2017/0019186 A1* | 1/2017 | Wiley | H04B 10/801 | |
| 2017/0039163 A1* | 2/2017 | Sejpal | G06F 13/4291 | |
| 2017/0091141 A1* | 3/2017 | Lee | G06F 13/4063 | |
| 2017/0116150 A1* | 4/2017 | Wiley | G06F 13/4282 | |
| 2017/0126444 A1* | 5/2017 | Chang | H04L 25/493 | |
| 2017/0264379 A1* | 9/2017 | Wiley | H04L 25/14 | |
| 2017/0264519 A1* | 9/2017 | Kanou | H04L 47/127 | |
| 2017/0264906 A1* | 9/2017 | Dai | H03M 5/00 | |
| 2017/0272231 A1* | 9/2017 | Chen | G06F 13/40 | |
| 2017/0336635 A1* | 11/2017 | Yoon | A61B 34/10 | |
| 2017/0359513 A1* | 12/2017 | Anantharaman | H04L 69/324 | |
| 2018/0019863 A1* | 1/2018 | Liao | H04L 7/0087 | |
| 2018/0027174 A1* | 1/2018 | Sengoku | G06F 3/04847 | 348/207.11 |
| 2018/0041185 A1* | 2/2018 | Omori | H03H 7/427 | |
| 2018/0062883 A1* | 3/2018 | Duan | H04L 7/0008 | |
| 2018/0062887 A1* | 3/2018 | Sengoku | H03M 13/09 | |
| 2018/0124343 A1* | 5/2018 | Vogelsang | H01L 27/14634 | |
| 2019/0266119 A1* | 8/2019 | Wiley | G06F 13/4068 | |
| 2019/0268015 A1* | 8/2019 | Dai | H03M 5/12 | |

* cited by examiner

METHOD OF IMPROVING CLOCK RECOVERY AND RELATED DEVICE

CROSS REFERENCE TO RELATED APPLICATIONS

This application claims the benefit of U.S. Provisional Application No. 62/361,503, filed on Jul. 13, 2016, the contents of which are incorporated herein by reference.

BACKGROUND OF THE INVENTION

1. Field of the Invention

The present invention relates to a method of improving clock recovery and related device, and more particularly, to a method of improving clock recovery for Mobile Industry Processor Interface (MIPI) and related device.

2. Description of the Prior Art

Mobile Industry Processor Interface (MIPI) is a standardized interface developed by MIPI Alliance. The latest physical layer specifications of MIPI include D-PHY, M-PHY and C-PHY, providing a connection between a master device and a slave device. Different from transmission with a differential pair (2-wire) in D-PHY and M-PHY, C-PHY uses 3-phase symbol encoding on 3-wire lanes for transmission. This symbol encoding technology may achieve a data rate of more than two bits per symbol. The differential signal pair is selectively allocated in 2 of the 3 wires. Therefore, there are 6 wire states based on the wire selection, as shown in Table 1. A wire state is a combination of signal levels driven on the three wires of a lane. One of six possible high-speed wire states shall be driven onto a lane during a high-speed unit interval (UI). Each of the wires A, B and C of a lane is driven to one of three signal levels: low, middle or high. In some implementations, the middle signal level may be the result of the transmitter not driving the signal. Each of the three wires in a lane shall be at a different signal level than the other two wires. The six wire states consist of the six possible permutations of driving the three wires of a lane with a different signal level on each wire. The six wire states are called +x, −x, +y, −y, +z and −z defined as those shown in Table 1.

TABLE 1

| Wire State | Signal Levels | | |
|---|---|---|---|
| Name | A | B | C |
| +x | High | Low | Middle |
| −x | Low | High | Middle |
| +y | Middle | High | Low |
| −y | Middle | Low | High |
| +z | Low | Middle | High |
| −z | High | Middle | Low |

According to MIPI C-PHY specification, the transmitter of a master device encodes a symbol stream to be signals transmitted on three-wire lanes and sends the signals to differential receivers of a slave device via the three-wire lanes. Symbol encoded to the wire states (+x, −x, +y, −y, +z and −z states) may ensure that a transition occurs in the high-speed data at every UI boundary. The slave device recovers the clock for latching data, based on these guaranteed transitions in a decoded symbol stream. The receivers of the slave device receive the wire states on the wires A, B, C and thereby generate differential output signals. The receivers are operated like comparators. One or more of the output signals will change at every UI boundary due to this symbol encoding rules. However, when multiple output signals change, the changings are often staggered in time and result in a time difference, called encoding jitter, due to slight differences in rise and fall times between the three signals (on wires A, B, C) of the lane and due to slight differences in signal propagation times between the combinations of signal pairs received (e.g., A-B, B-C, and C-A). This encoding jitter may result in wrong clock recovery.

SUMMARY OF THE INVENTION

It is therefore an objective of the present invention to provide a method used for Mobile Industry Processor Interface (MIPI), which is capable of improving clock recovery, and related device.

An embodiment of the present invention discloses a method for a MIPI master device for improving clock recovery at a MIPI slave device. The method comprises transmitting a symbol sequence comprising a plurality of consecutive symbols which comprise at least one of a first symbol value and a second symbol value to the MIPI slave device prior to transmitting packet data to the MIPI slave device, wherein the first symbol value and the second symbol value bring relatively larger encoding jitters than other symbol values.

An embodiment of the present invention further discloses a method for a MIPI slave device for improving clock recovery. The method comprises receiving a wire state and generating three differential output signals, wherein the wire state is a combination of signal levels on three transmission wires; generating each of a first number of symbols based on a transition from a previous wire state to a present wire state which are obtained by using a clock signal generated by a clock recovery circuit of the MIPI slave device, wherein the pulse width of the clock signal is controlled by a timing delay configured in the clock recovery circuit; for each of the first number of symbols, determining whether each symbol is identical with a corresponding symbol of a reference symbol sequence and generating a determination result, wherein the reference symbol sequence comprises a plurality of consecutive symbols which comprise at least one of a first symbol value and a second symbol value, and wherein the first symbol value and the second symbol value bring relatively larger encoding jitters than other symbol values; and configuring, according to the first number of determination results, the value of the timing delay to control the pulse width of the clock signal.

An embodiment of the present invention further discloses a MIPI slave device, which comprises a plurality of receivers, a symbol decoder and a determination unit. The plurality of receivers are used for receiving a wire state and generating three differential output signals, wherein the wire state is a combination of signal levels on three transmission wires. The symbol decoder is used for generating each of a first number of symbols based on a transition from a previous wire state to a present wire state which are obtained by using a clock signal generated by a clock recovery circuit of the MIPI slave device, wherein the pulse width of the clock signal is controlled by a timing delay configured in the clock recovery circuit. The determination unit is used for determining whether each of the first number of symbols is identical with a corresponding symbol of a reference symbol sequence and generating a determination result, and configuring the value of the timing delay to control the pulse width of the clock signal according to the first number of determination results. The reference symbol sequence comprises a plurality of consecutive symbols which comprise at least one of a first symbol value and a second symbol value, wherein the first symbol value and the second symbol value bring relatively larger encoding jitters than other symbol values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
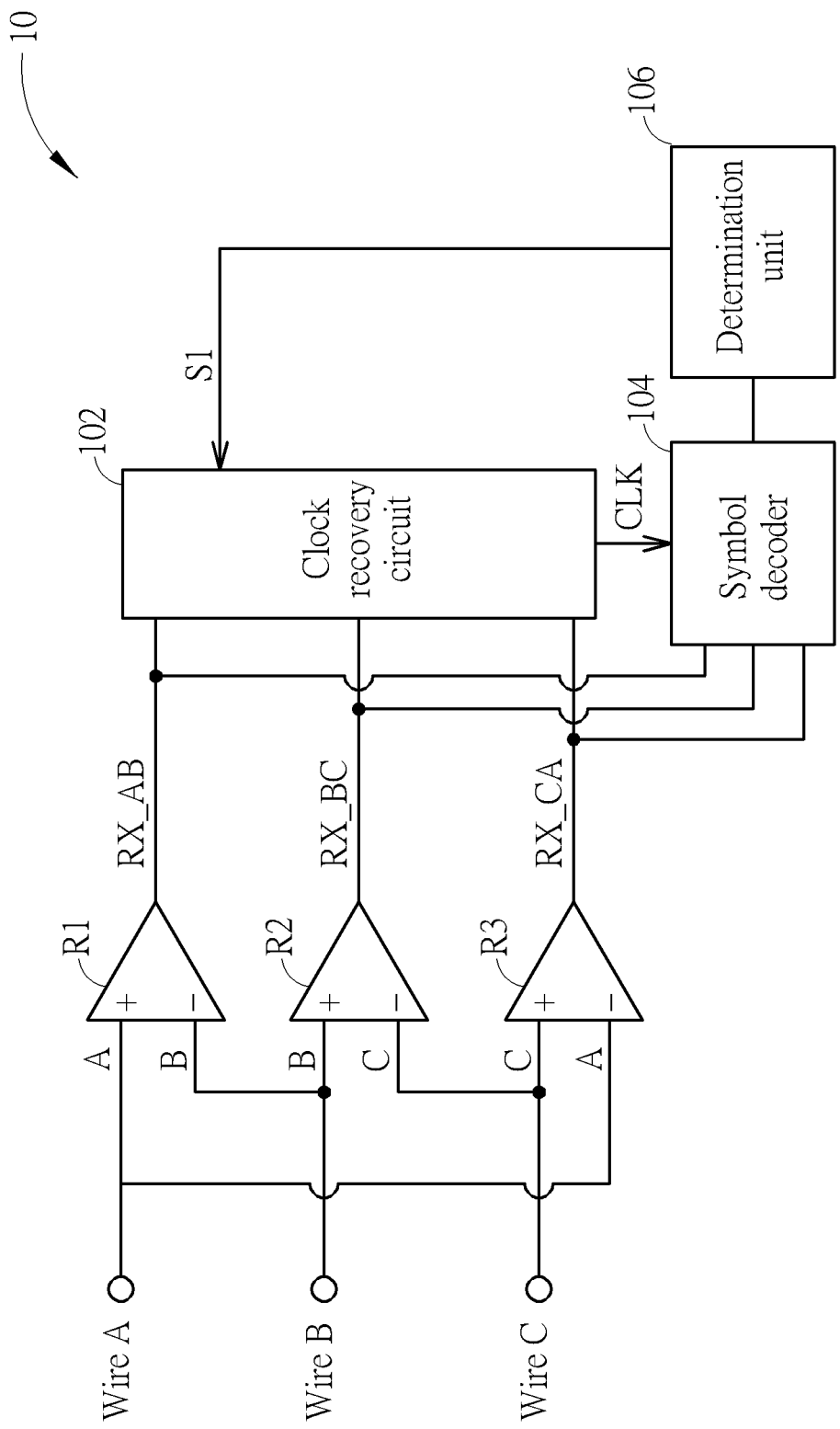
FIG. 1 is a schematic diagram of a slave device having an interface conforming Mobile Industry Processor Interface (MIPI) C-PHY specification according to an embodiment of the present invention.

Please refer to FIG. 1, which is a schematic diagram of a slave device 10 having an interface conforming Mobile Industry Processor Interface (MIPI) C-PHY specification according to an embodiment of the present invention. As shown in FIG. 1, the slave device 10 includes a clock recovery circuit 102, a symbol decoder 104, a determination unit 106 and three receivers R1-R3. The receivers R1-R3 are differential receivers respectively coupled to two of three wires A, B, and C. The receivers R1-R3 are used for receiving signals transmitted on the differential wire pairs A-B, B-C, and C-A during each high-speed unit interval (UI), and generating differential output signals RX_AB, RX_BC and RX_CA based on the signal difference of the wire pairs A-B, B-C and C-A. A combination of signal levels of the received signals on the wires A, B, and C are represented by wire states +x, −x, +y, −y, +z and −z as illustrated in Table 1. For example, the output signal RX_AB refers to a comparison result of signal levels on the wires A and B. If the signal level of the wire A is greater than the signal level of the wire B, the output signal RX_AB is "1" (which means logic high level); if the signal level of the wire A is smaller than the signal level of the wire B, the output signal RX_AB is "0" (which means logic low level). In the same manner, those skilled in the art should be able to deduce the values of the output signals RX_BC and RX_CA according to the signal levels of the wires A, B and C in each wire state.

The clock recovery circuit 102 is used for generating a clock signal CLK according to the output signals RX_AB, RX_BC and RX_CA. Since the C-PHY transmission lanes do not include a dedicated clock lane, the clock signal CLK should be generated based on the signals received from the wires A, B and C by using clock recovery techniques. As mentioned above, the symbol encoding scheme of MIPI C-PHY ensures that a transition occurs at every unit interval (UI) boundary, so the clock recovery circuit 102 is able to recover the clock according to the guaranteed transitions in a decoded symbol stream. The symbol decoder 104 receives the output signals RX_AB, RX_BC and RX_CA and generates the symbols based on transitions of the output signals RX_AB, RX_BC and RX_CA. The determination unit 106 receives the symbols generated by the symbol decoder 104, to determine whether the received symbols are correct, and thereby outputs a control signal S1 to the clock recovery circuit 102 to adjust or configure the clock signal CLK.

Figure 2:
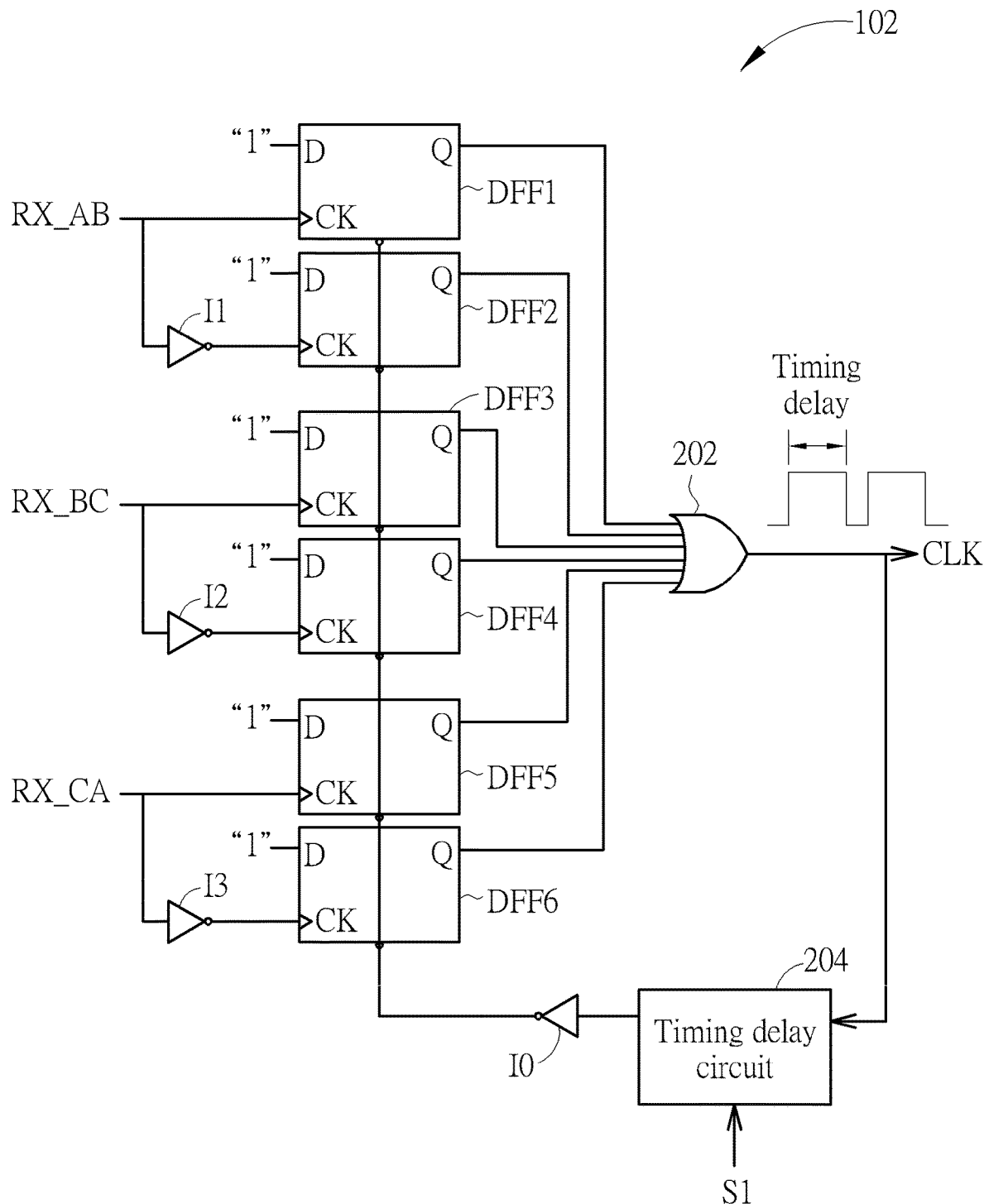
FIG. 2 is a schematic diagram of an exemplary implementation of the clock recovery circuit in the slave device.

Please refer to FIG. 2, which is a schematic diagram of an exemplary implementation of the clock recovery circuit 102. The clock recovery circuit 102 may include six D flip-flops DFF1-DFF6, four inverters I0-I3, an OR gate 202 and a timing delay circuit 204. The output signals RX_AB, RX_BC and RX_CA from the receivers R1-R3 are directly inputted to the clock input terminal of the D flip-flops DFF1, DFF3 and DFF5, respectively, and are inversely inputted to the clock input terminal of the D flip-flops DFF2, DFF4 and DFF6 via the inverters I1-I3, respectively. The data input terminals of the D flip-flops DFF1-DFF6 receive a logic high level "1". The OR gate 202 receives the output signals of the D flip-flops DFF1-DFF6 and generates the clock signal CLK accordingly. This implementation allows the clock signal CLK to transit from "0" to "1" when any of the output signals RX_AB, RX_BC and RX_CA changes; this may occur at every UI boundary due to wire state transitions. After the clock signal CLK transits to "1", the timing delay circuit 204, which may be composed of a delay chain, receives the clock signal CLK from the OR gate 202 and receives the control signal S1 from the determination unit 106, and outputs a delay signal to the reset terminals of the D flip-flops DFF1-DFF6. The delay signal resets the D flip-flops DFF1-DFF6 and thereby the output signals of the D flip-flops DFF1-DFF6 are pulled low to "0"; hence, the clock signal CLK transits from "1" to "0" accordingly. In this implementation, the timing delay value of the timing delay circuit 204 determines the pulse width of the clock signal CLK, i.e., the time length of the clock signal CLK staying at logic high level "1" as shown in FIG. 2. Since transition of wire states occurs at every UI boundary due to the symbol encoding rules of MIPI C-PHY, the transition of the clock signal CLK also occurs at every UI boundary. This allows the clock signal CLK to have a period the same as the period of a wire state, in order to realize clock recovery. Note that the structure of the clock recovery circuit 102 is only one of various embodiments of the present invention, and this should not be a limitation of the scope of the present invention.

Figure 3:
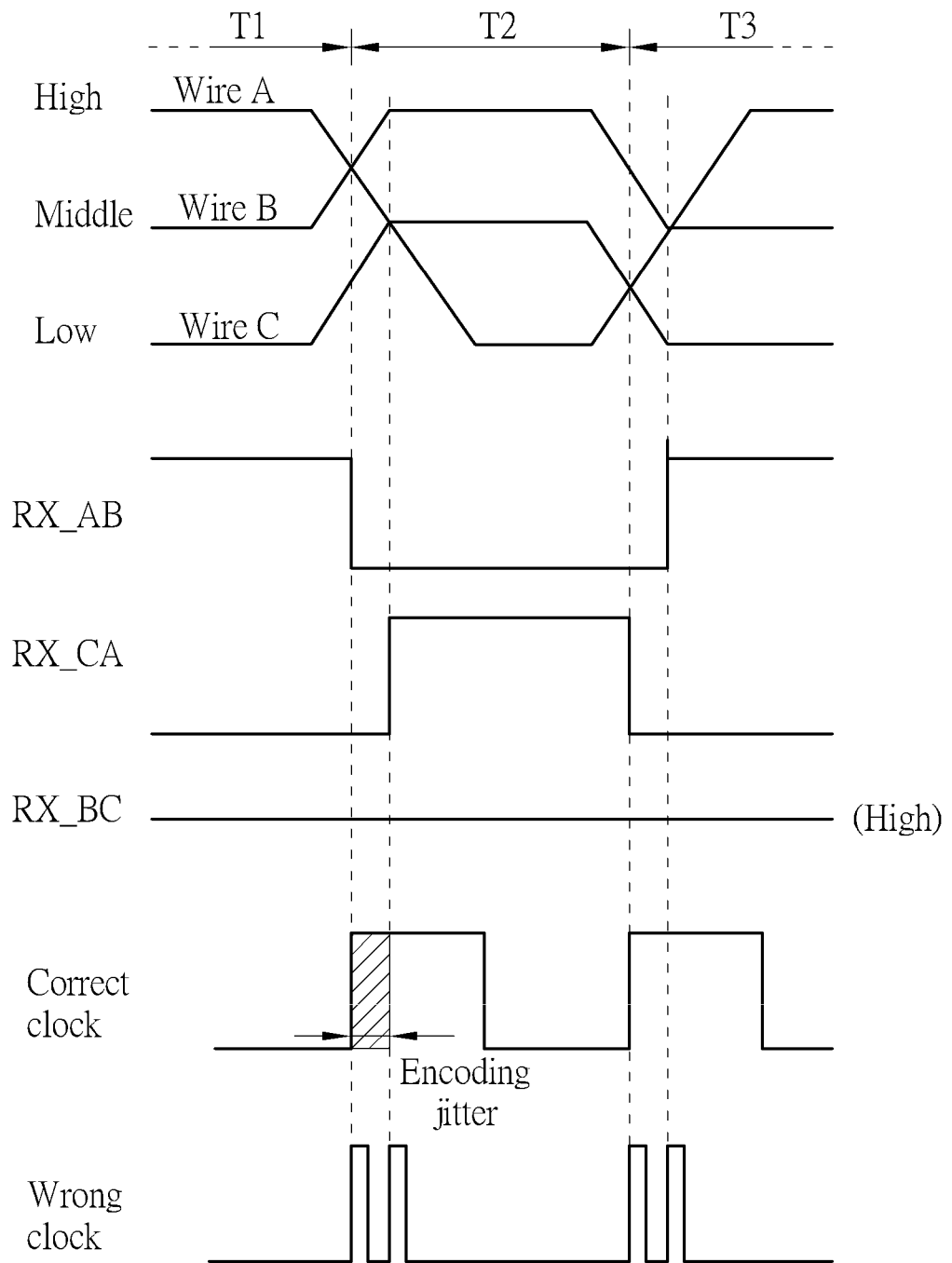
FIG. 3 is a waveform diagram of wire states and signals in the slave device.

Please refer to FIG. 3, which is a waveform diagram of wire states and signals in the slave device 10, where three UIs T1-T3 are illustrated. The wire A is in the high signal level in the UI T1, transits to the low signal level in the UI T2, and transits to the high signal level in the UI T3. The wire B is in the middle signal level in the UI T1, transits to the high signal level in the UI T2, and transits to the middle signal level in the UI T3. The wire C is in the low signal level in the UI T1, transits to the middle signal level in the UI T2, and transits to the low signal level in the UI T3. The output signals RX_AB, RX_BC and RX_CA are generated according to state transitions of the wires A, B and C. As shown in FIG. 3, the signal driven on the wire A has a larger transition degree (between signal levels "High" and "Low") than the signals driven on the wires B and C, so the signal driven on the wire A has longer rise time and fall time, which results in time difference in transitions of the output signals RX_AB, RX_BC and RX_CA. The encoding jitter is the time difference between the first zero-crossing time and the last zero-crossing time among the differential signals on wire pairs A-B, B-C and C-A, and is also treated as time difference between the first transition (0→1 or 1→0) and the last transition among the output signals RX_AB, RX_BC and RX_CA. The amount of encoding jitter may be influenced by the voltage swing of data outputted by the transmitter of the MIPI C-PHY master device, the driving capability of the transmitter and/or the channel characteristics of transmission lines on the wires A, B and C.

As mentioned above, the timing delay value of the timing delay circuit 204 determines the pulse width of the clock signal CLK. If the timing delay is too small, the clock signal CLK may rapidly change to "0" and then be triggered to rise to "1" again in the same UI due to the encoding jitter. As the beginning of the UI T2 shown in FIG. 3, the clock signal rises at the falling edge of the output signal RX_AB, and then falls rapidly with an insufficient timing delay. The wrong clock signal then rises at the rising edge of the output signal RX_CA in the same UI T2; this results in a wrong clock period. On the other hand, if the timing delay is too large, the setup time and hold time for latching data may not be enough and thus incorrect data may be generated. Therefore, the timing delay circuit 204 may be capable of generating a proper timing delay that controls the pulse width of the clock signal CLK to be longer than the encoding jitter, in order to generate a correct clock signal.

Figure 4:
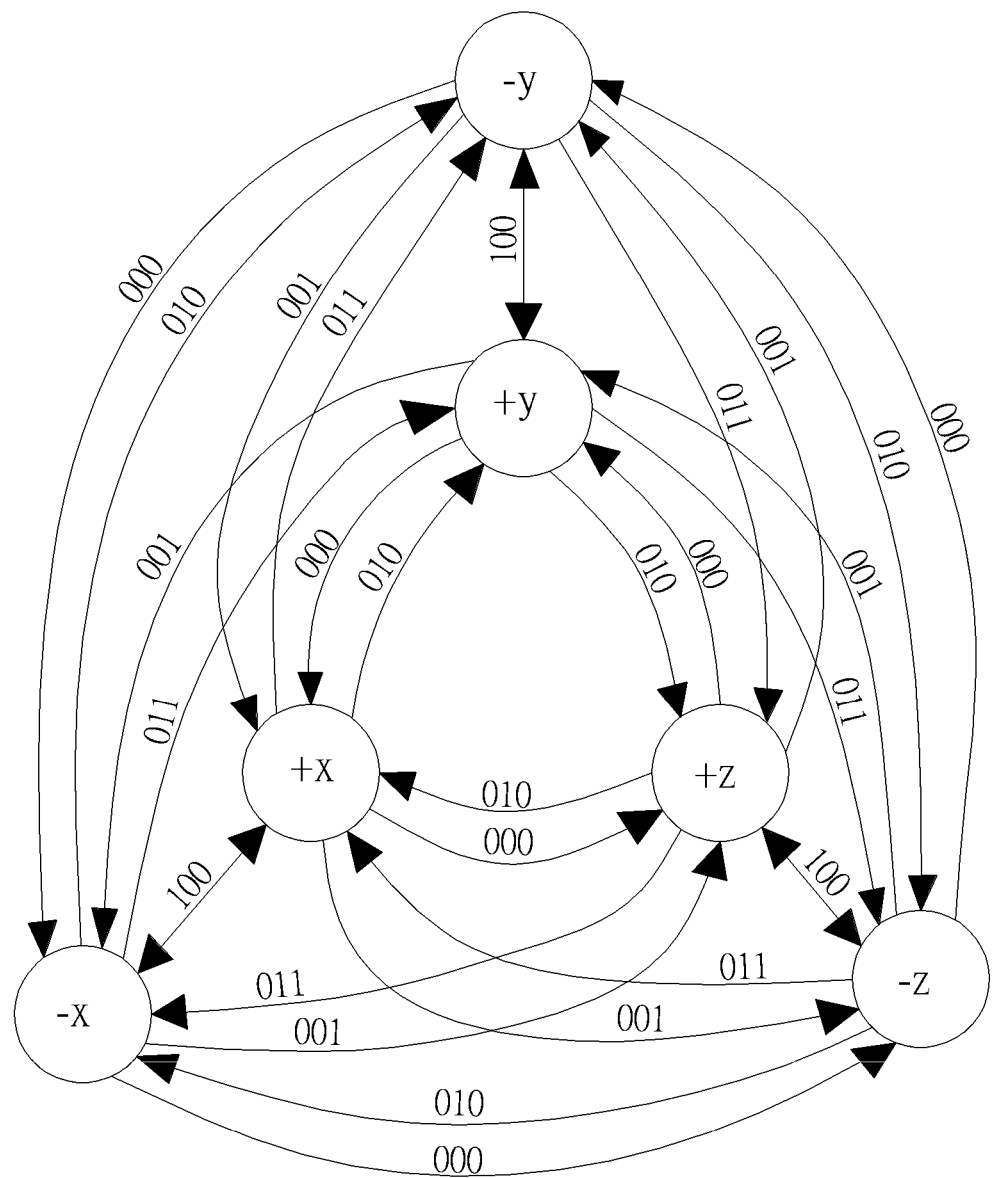
FIG. 4 is a schematic diagram of symbol encoding/decoding scheme between the wire states and symbols.

The symbol encoding/decoding scheme between the wire states and symbols is illustrated in FIG. 4. As shown in FIG. 4, there are six possible wire states +x, −x, +y, −y, +z and −z, which correspond to the signal levels in wires A, B and C shown in Table 1. Each symbol has a 3-bit symbol value, which is defined by a transition between two different wire states in two consecutive UIs. For example, a transition from the wire state +x to the wire state +y is decoded to a symbol value "010", a transition from the wire state +y to the wire state −z is decoded to a symbol value "011". More specifically, taking the wire state transitions shown in FIG. 3 as an example, the wire states in the UIs T1-T3 are −z, −x and −z, respectively; hence, the decoded symbol values are "010" (from −z to −x) and "000" (from −x to −z).

As shown in FIG. 4, there are five possible symbol values "000", "001", "010", "011" and "100" based on transitions of the wire states +x, −x, +y, −y, +z and −z. For the sake of simplicity, the symbol values are written in decimal form hereinafter. That is, symbol value 0 stands for "000", symbol value 1 stands for "001", symbol value 2 stands for "010", symbol value 3 stands for "011", and symbol value 4 stands for "100".

Figure 5A:
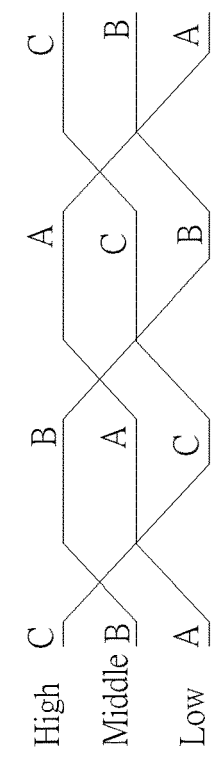
FIGS. 5A and 5B are schematic diagrams of various transitions of wire states, differential output signals, and corresponding symbol values.
Figure 5A:
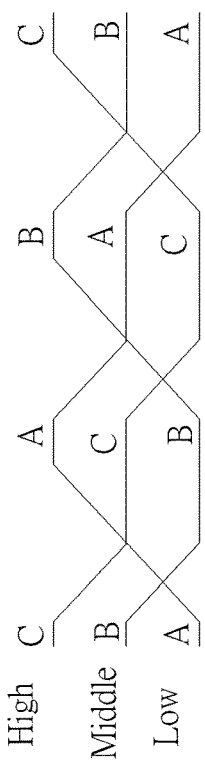
Figure 5A:
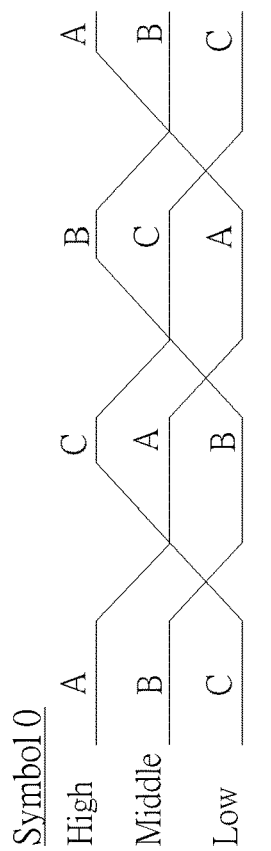
Figure 5A:
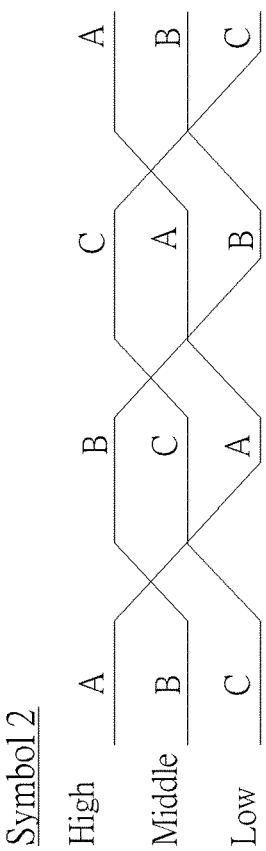
Figure 5B:
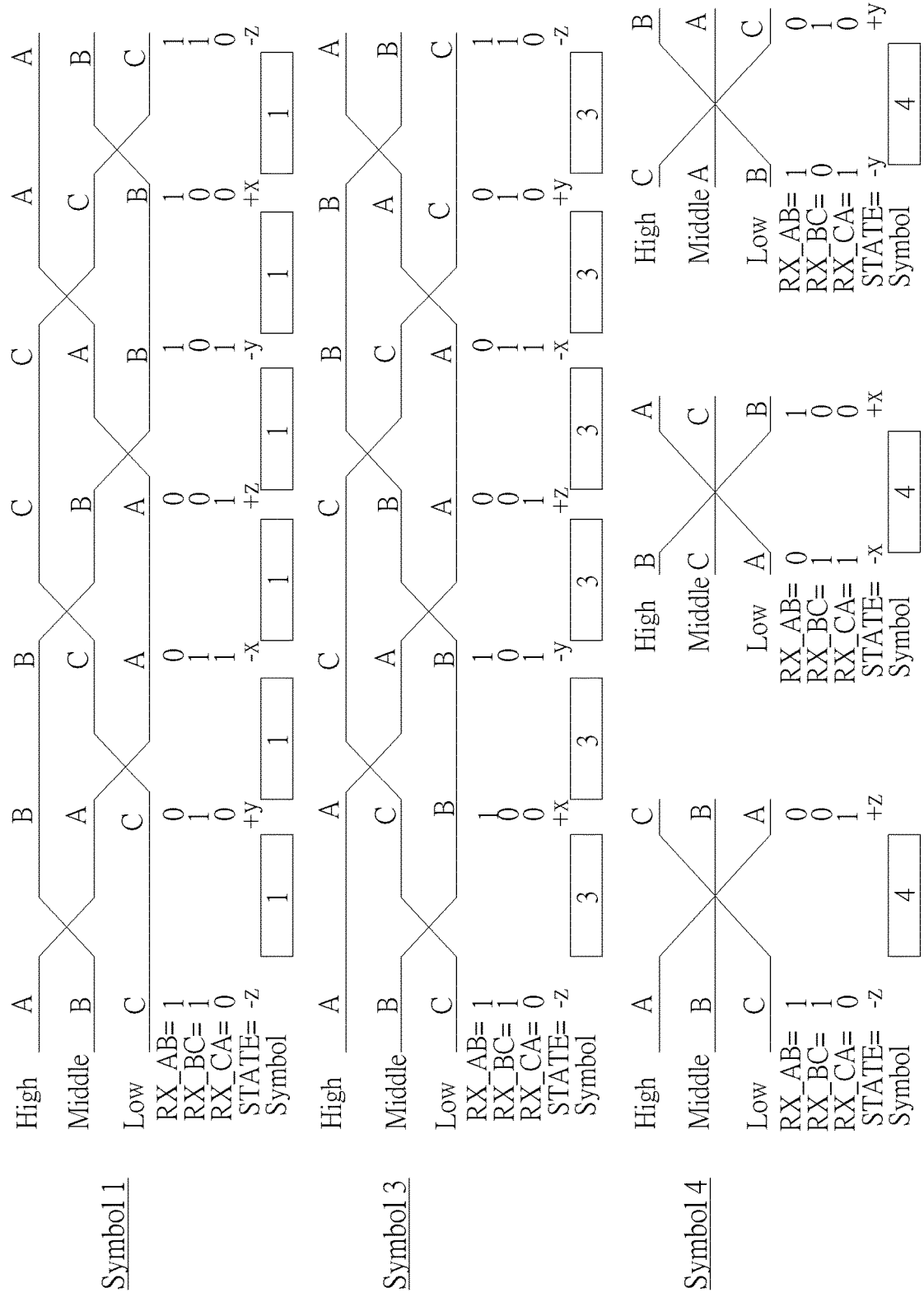

Please refer to FIGS. 5A and 5B, which are schematic diagrams of various transitions of wire states, differential output signals, and corresponding symbol values. FIG. 5A illustrates the symbol values 0 and 2. The symbol value 0 is defined by the wire state transition from −z to −y, from −y to −x, from −x to −z, from +z to +y, from +y to +x, or from +x to +z. The symbol value 2 is defined by the wire state transition from −z to −x, from −x to −y, from −y to −z, from +z to +x, from +x to +y, or from +y to +z. For the symbol values 0 and 2, all of the three wires A, B and C change their signal levels in the UI boundary, where two of them change with a smaller degree and the other one changes with a larger degree which requires more transition time. Therefore, a larger encoding jitter may be accompanied by the symbol value 0 or 2 due to different transition time of the wires A, B and C.

FIG. 5B illustrates the symbol values 1, 3 and 4. The symbol value 1 is defined by the wire state transition from −z to +y, from +y to −x, from −x to +z, from +z to −y, from −y to +x, or from +x to −z. The symbol value 3 is defined by the wire state transition from −z to +x, from +x to −y, from −y to +z, from +z to −x, from −x to +y, or from +y to −z. The symbol value 4 is defined by the wire state transition from −z to +z, from −x to +x, or from −y to +y. For the symbol values 1, 3 and 4, only two of the three wires A, B and C change their levels in the UI boundary, and these two wires transit with the same degree and similar transition time. Therefore, there may be no or a small encoding jitter generated with the symbol value 1, 3 or 4.

As can be seen, when the symbol value 2 or 0 is received at the MIPI C-PHY slave device, the encoding jitter may be relatively larger than the encoding jitter generated when other symbol values 1, 3 and 4 are received, because differences in signal transition times between the combinations of received signal pairs are relatively larger in reception of symbol values 2 and 0 than in reception of other symbol values.

In order to eliminate the influence of encoding jitter, the clock recovery circuit 102 according to the embodiment of the present invention may be capable of recovering the clock signal by using a proper timing delay which can filter out the largest possible encoding jitters resulted from the transmission of symbol sequence including a symbol value 2 or 0. Thus, the recovered clock signal may correctly latch data in packet data reception.

Therefore, before transmitting the packet data to the MIPI slave device, a symbol sequence including at least one of symbol values 2 and 0 may be transmitted from the MIPI master device to the MIPI slave device such that a proper timing delay of the timing delay circuit 204 of the clock recovery circuit 102 of the MIPI slave device may be determined. In detail, please refer to FIG. 6, which is a schematic diagram of a master device 60 having a MIPI interface according to an embodiment of the present invention. The master device 60 includes a symbol encoder 602 and drivers D1-D3. The symbol encoder 602 converts a symbol sequence into wire states on wires A, B and C, where each symbol of the symbol sequence is converted into a present wire state to be transmitted in the present UI based on the symbol value and the previous wire state transmitted in the previous UI according to the symbol encoding rule shown in FIG. 4. For example, when the symbol value is 2 (as 3-bit value "010") and the previous wire state is +y, then the present wire state to be sent is +z. The drivers D1-D3 then transmit the wire states converted from the symbol sequence to the MIPI slave device via the wires A, B and C before transmitting the packet data.

Figure 7:
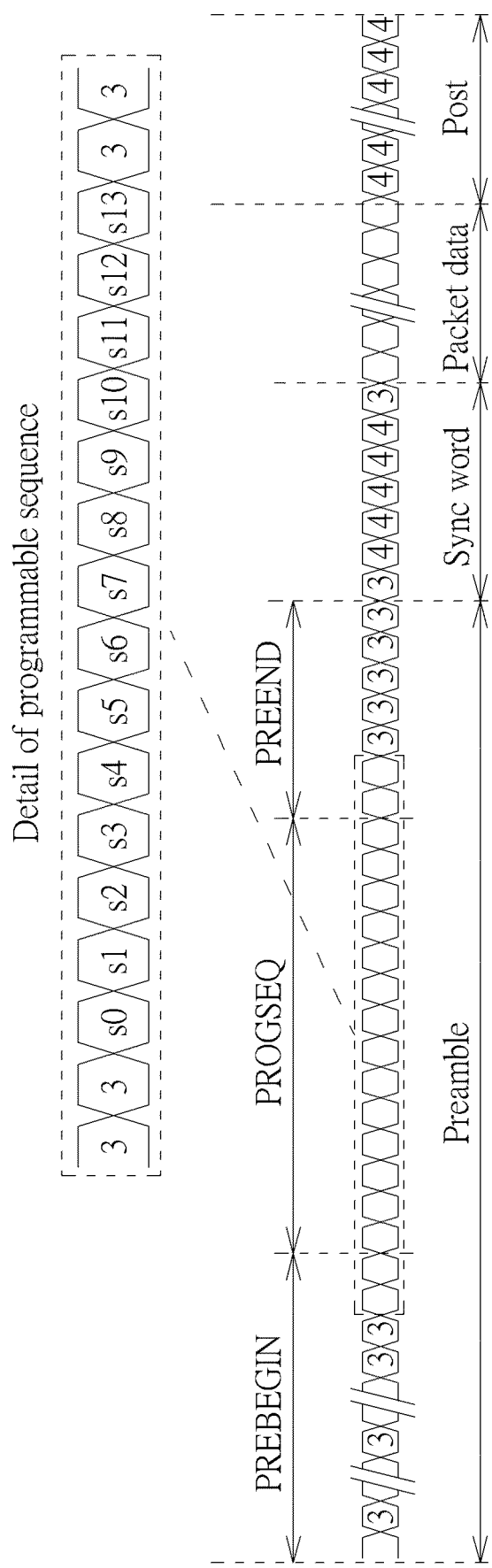
FIG. 7 is a schematic diagram of a high-speed data transmission defined in MIPI C-PHY specification.

In an embodiment, the symbol sequence used for finding out the proper timing delay for the clock recovery circuit may be transmitted in a programmable sequence in the preamble of a packet data transmission. Please refer to FIG. 7, which is a schematic diagram of a high-speed data transmission defined in MIPI C-PHY specification. As shown in FIG. 7, a high-speed data transmission includes a preamble, synchronization words, packet data, and the end of packet data which is called post field. The lanes are in a control mode (which is a low-power mode) before and after the high-speed data transmission (which is in a high-speed mode), which is known to those skilled in the art and not depicted in FIG. 7. The preamble is transmitted when the signal transmission switches from the control mode to the high-speed mode. The preamble is followed by the synchronization words, which is transmitted before the packet data. The preamble and the synchronization words allow the MIPI slave device to get ready to receive the high-speed packet data. In detail, the synchronization words include a symbol sequence having symbol values "3444443", and the receivers and other back-end circuits of the MIPI slave device may be aligned with the synchronization words to receive follow-up packet data.

The preamble includes a begin section (PREBEGIN), a mid-section (PROGSEQ) and an end section (PREEND) in sequence. The begin section and the end section are composed of a sequence of symbols all having symbol value 3. The mid-section includes a programmable sequence having 14 symbols s0-s13, which may be used for transmitting a preconfigured symbol sequence for finding out the proper timing delay at the MIPI slave device. The programmable sequence includes at least one of symbol values 2 and 0, in order to generate a larger encoding jitter when the programmable sequence is received by the MIPI slave device. Since MIPI C-PHY specification does not define or specify the symbol values of the programmable sequence, it is feasible to include the symbol values 2 and/or 0 in the programmable sequence according to embodiments of the present invention. After transmission of the programmable sequence is finished, the MIPI slave device may determine a timing delay for performing clock recovery to generate the clock signal, which may be then used for decoding the symbol sequence of value 3 in the end section and the symbol sequence having symbol values "3444443" in the synchronization words. This determined timing delay may be a proper timing delay if these symbols in the programmable sequence are decoded correctly.

In an embodiment, the symbol sequence transmitted to the MIPI slave device prior to transmitting the packet data may include three consecutive symbols of symbol value 2 and/or three consecutive symbols of symbol value 0. Please refer to FIG. 5A again. The symbol value 0 corresponds to the wire state transitions from −z to −y, from −y to −x, from −x to −z, from +z to +y, from +y to +x, and from +x to +z. Therefore, three symbols of symbol value 0 may be realized in four consecutive UIs, which may correspond to three consecutive wire state transitions such as −z→−y→−x→−z or +z→+y→+x→+z. The three consecutive symbols of symbol value 0 ensure that the larger encoding jitter generated by wire state transition together with the mismatch of signal transition times in different wires can be detected in the MIPI slave device. This is because the three wire state transitions, e.g., −z→−y, −y→−x and −x→−z, may have a larger degree of signal level transition in different wires A, B and C, the drivers corresponding to the wires A, B and C may have different driving capabilities, and the wires A, B and C may have different characteristics. For example, according to Table 1, the wire state transition from −z to −y (as symbol value 0) indicates that the wire C has a larger signal level transition from level "Low" to level "High", while the wire state transition from −y to −x indicates that the wire B has a larger signal level transition from level "Low" to level "High".

In addition, a symbol of symbol value 4 may be inserted between a first set of three consecutive symbols of symbol value 0 and a second set of three consecutive symbols of symbol value 0, to generate a symbol sequence "0004000", which may correspond to consecutive wire state transitions such as −z→−y→−x→−z→+z→+y→+x→+z. In this symbol sequence, the larger encoding jitters accompanied by a larger degree of rising transition and falling transition in the wires A, B and C are detected in the MIPI slave device. It is preferable to include the symbol sequence "0004000" in the symbol sequence used for finding the timing delay, since the symbol sequence "0004000" includes all possible wire state transitions corresponding to the symbol value 0.

Similarly, the symbol value 2 corresponds to the wire state transitions from −z to −x, from −x to −y, from −y to −z, from +z to +x, from +x to +y, and from +y to +z. Therefore, three symbols of symbol value 2 may be realized in three consecutive UIs, which may correspond to three consecutive wire state transitions such as −z→−x→−y→−z or +z→+x→+y→+z. The three consecutive symbols of symbol value 2 ensure that the larger encoding jitter generated by wire state transition together with the mismatch of signal transition times in different wires can be detected in the MIPI slave device. This is because the three wire state transitions, e.g., −z→−x, −x→−y and −y→−z, may have a larger degree of signal level transition in different wires A, B and C, the drivers corresponding to the wires A, B and C may have different driving capabilities, and the wires A, B and C may have different characteristics. Therefore, it is preferable to include at least three consecutive symbols of symbol value 2 in the symbol sequence in consideration of the mismatch in different wires A, B and C and their corresponding drivers.

In addition, a symbol of symbol value 4 may be inserted between a first set of three consecutive symbols of symbol value 2 and a second set of three consecutive symbols of symbol value 2, to generate a symbol sequence "2224222", which may correspond to consecutive wire state transitions such as −z→−x→−y→−z→+z→+x→+y→+z. In this symbol sequence, the larger encoding jitters accompanied by a larger degree of rising transition and falling transition in the wires A, B and C are detected in the MIPI slave device. It is preferable to include the symbol sequence "2224222" in the symbol sequence used for finding the timing delay, since the symbol sequence "2224222" includes all possible wire state transitions corresponding to the symbol value 2.

In an embodiment, if the programmable sequence (PROGSEQ) is used as the symbol sequence including at least one of symbol values 2 and 0 transmitted to the MIPI slave device prior to transmitting the packet data, the length of the symbol sequence may conform to the length the programmable sequence, such as 14 symbols defined in MIPI C-PHY specification. For example, the symbol sequence may be 14 symbols "22242220004000", and such a symbol sequence may include every possible wire state transition with respect to symbol values 2 and 0. As a result, the symbol sequence transmitted to the MIPI slave device may bring an even larger encoding jitter, and may be useful for determining the timing delay configured in the clock recovery circuit that controls the pulse width of the clock signal. In another embodiment, the symbol sequence including at least one of symbol values 2 and 0 may not be the programmable sequence (PROGSEQ) but may be configured to be transmitted to the MIPI slave device prior to transmitting the packet data, and the number of symbols in the symbol sequence is not limited to conform to the length of programmable sequence. These symbols may also be combined with other symbols of symbol value 1, 3 and/or 4.

Please note that the above embodiments are only several possible implementations among various implementations of the symbol sequence according to the embodiments of the present invention. For example, the three consecutive symbols of symbol value 0 may be implemented with other wire state transitions such as −y→−x→−z→−y, and the three consecutive symbols of symbol value 2 may be implemented with other wire state transitions such as −x→−y→−z→−x. In another embodiment, the symbol sequence may include the combination of three consecutive symbols of symbol value 2 and three consecutive symbols of symbol value 0, to generate a symbol sequence "222000", which may correspond to consecutive wire state transitions such as −z→−x→−y→−z→−y→−x→−z.

The MIPI slave device, e.g., the slave device 10 shown in FIG. 1, then receives the wire states from the wires A, B and C. The slave device 10 may receive the symbol sequence by using the clock signal CLK generated by the clock recovery circuit 102, where the pulse width of the clock signal CLK is controlled by the timing delay applied in the timing delay circuit 204 of the clock recovery circuit 102, as shown in FIG. 2. In detail, the receivers R1-R3 may receive a wire state and generate three differential output signals RX_AB, RX_BC and RX_CA according to the wire state. The symbol decoder 104 may include a latch circuit (not shown in FIG. 1) for generating three present digital output signals by using the clock signal CLK to latch the differential output signals RX_AB, RX_BC and RX_CA at a first sampling time and generating another three digital output signals by using the clock signal CLK to latch the present digital output signals at a second sampling time after the first sampling time, which are used as previous digital output signals. The symbol decoder 104 may generate a present symbol value based on the transition from a previous wire state corresponding to three previous digital output signals to a present wire state corresponding to three present digital output signals. The decoded symbols are sent to the determination unit 106. The determination unit 106 may compare a specific number of symbols of the symbol sequence (e.g., 3 of total 14 received symbols) with a reference symbol sequence, to determine whether each symbol of the specific number of symbols is identical with a corresponding symbol of the reference symbol sequence, and generate a determination result accordingly. Note that the reference symbol sequence is the same as all of or parts of the symbol sequence transmitted by the MIPI master device, for checking whether the symbol sequence received by the slave device 10 is correct. In such a situation, the reference symbol sequence may also include at least one of symbol values 2 and 0. If the determination result indicates that the specific number of received symbols are correct, the determination unit 106 may determine that the received symbol sequence is not influenced by the encoding jitter accompanied by the symbol value 2 or 0 under the present clock signal CLK, and thereby determine that the timing delay controlling the pulse width of the present clock signal CLK has a proper value. Therefore, the clock recovery circuit 102 of the slave device 10 may find out the proper value of the timing delay, and thereby generate the clock signal CLK used for receiving the packet data.

Several possible values of the timing delay may be configured in the slave device 10. In an embodiment, the timing delay may be initially configured to be the smallest value among the possible values of the timing delay. In detail, the determination unit 106 may transmit the control signal S1 to the timing delay circuit 204 of the clock recovery circuit 102, to increase the timing delay applied to control the pulse width of the clock signal CLK, e.g., increase by one step, if the specific number of determination results indicate at least one of the specific number of symbols having been received is not identical to the corresponding symbol in the reference symbol sequence (i.e., determined to be wrong), which means that there is a need to adjust the timing delay. The determination unit 106 then receives subsequent symbols of the symbol sequence generated based on a clock signal that is generated by using the increased timing delay, which means the pulse width of the clock signal is increased.

On the other side, the determination unit 106 may determine that the present value of the timing delay is proper to be used for the clock recovery circuit 102 to generate the clock signal CLK for receiving packet data, if the specific number of determination results indicate that every symbol of the specific number of symbols having been received is identical to the corresponding symbol in the reference symbol sequence, which means there is no need to adjust the timing delay. Thereby, the present timing delay is configured to be the proper timing delay. The clock recovery circuit 102 may generate the clock signal CLK based on the proper timing delay that controls the pulse width of the clock signal CLK, so that the symbol decoder 104 is able to receive packet data correctly by using the clock signal CLK.

In another embodiment, even if the specific number of determination results corresponding to the specific number of symbols having been received indicate that there is no need to adjust the pulse width of the clock signal CLK, the determination unit 106 may still increase the timing delay and the clock recovery circuit 102 generates a corresponding clock signal CLK for receiving subsequent symbols. The timing delay increasing may be repeatedly performed until a subsequent specific number of determination results corresponding to the latest received symbols indicate any of the latest received consecutive symbols is determined to be wrong. In such a situation, the determination unit 106 may obtain a range of proper values of the timing delay, and the clock recovery circuit 102 may select one of the proper values of the timing delay to control the pulse width of the clock signal CLK for receiving packet data. For example, the determination unit 106 may select an optimal timing delay that may be the middle value in this range to perform clock recovery.

Figure 8:
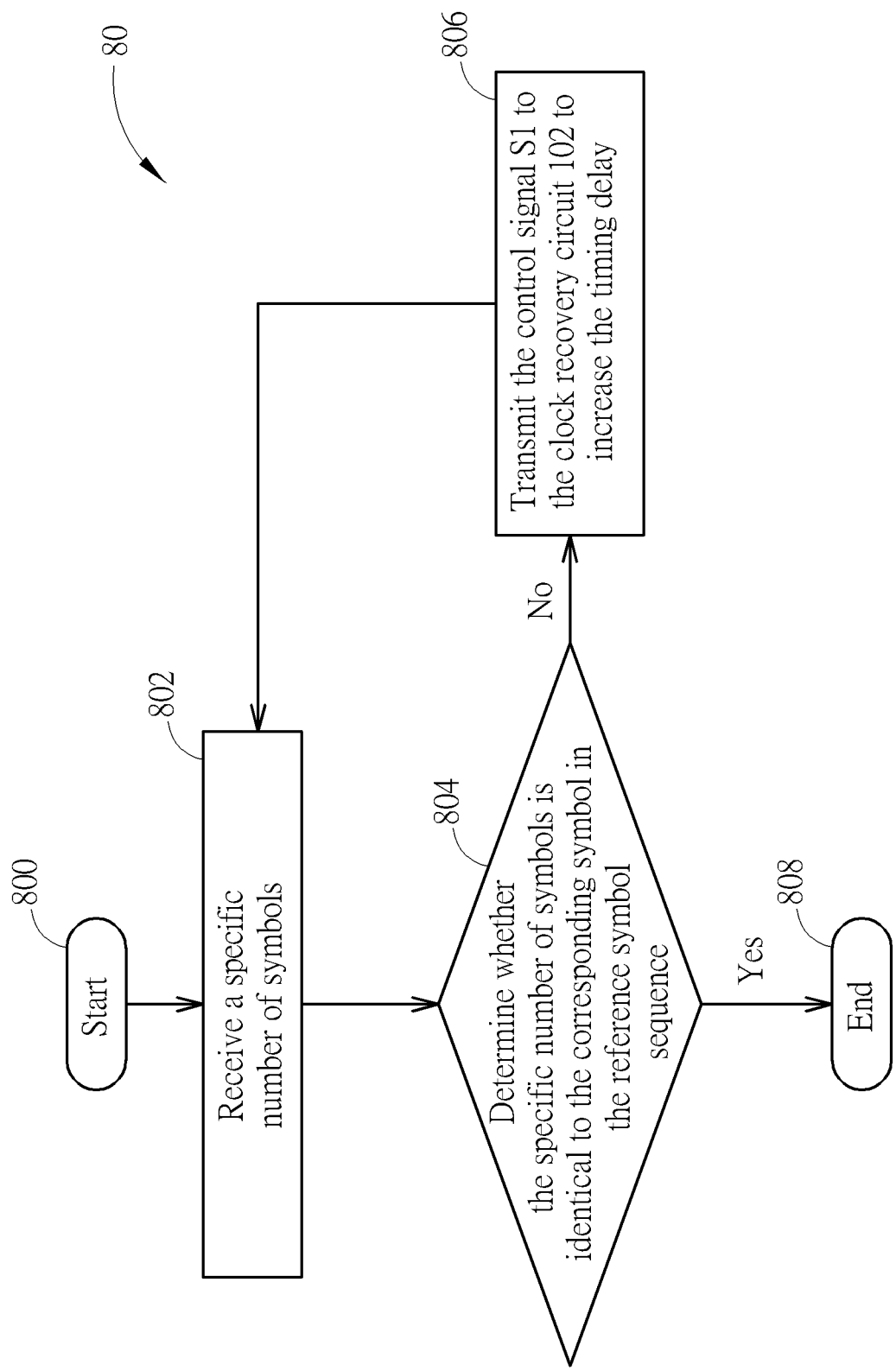
FIG. 8 is a schematic diagram of a process according to an embodiment of the present invention.

The above operations of determining the timing delay for clock recovery may be summarized into a process 80, as shown in FIG. 8. The process 80, which may be implemented in the determination unit 106 of the slave device 10 shown in FIG. 1, includes the following steps:

Step 800: Start.

Step 802: Receive a specific number of symbols.

Step 804: Determine whether the specific number of symbols is identical to the corresponding symbol in the reference symbol sequence. If yes, go to Step 808; otherwise, go to Step 806.

Step 806: Transmit the control signal S1 to the clock recovery circuit 102 to increase the timing delay. Then go to Step 802.

Step 808: End.

In another embodiment, the timing delay may be initially configured to be the largest value among the possible values of the timing delay. In detail, the determination unit 106 may transmit the control signal S1 to the timing delay circuit 204 of the clock recovery circuit 102, to decrease the timing delay applied to control the pulse width of the clock signal CLK, e.g., decrease by one step, if the specific number of determination results indicate at least one of the specific number of symbols having been received is not identical to the corresponding symbol in the reference symbol sequence (i.e., determined to be wrong), which means that there is a need to adjust the timing delay. The determination unit 106 then receives subsequent symbols of the symbol sequence generated based on a clock signal that is generated by using the decreased timing delay, which means the pulse width of the clock signal is decreased.

On the other side, the determination unit 106 may determine that a present value of the timing delay is proper to control the pulse width of the clock signal CLK, if a specific number of corresponding determination results indicate that every symbol of the specific number of symbols having been received is identical to the corresponding symbol in the reference symbol sequence, which means there is no need to adjust the timing delay. Thereby, the present timing delay is configured to be the proper timing delay. The clock recovery circuit 102 may generate the clock signal CLK based on the proper timing delay that controls the pulse width of the clock signal CLK, so that the symbol decoder 104 is able to receive packet data correctly based on the clock signal CLK. In another embodiment, the determination unit 106 may obtain a range of proper values of the timing delay and the clock recovery circuit 102 may select one of the proper values to control the pulse width of the clock signal CLK.

Figure 9:
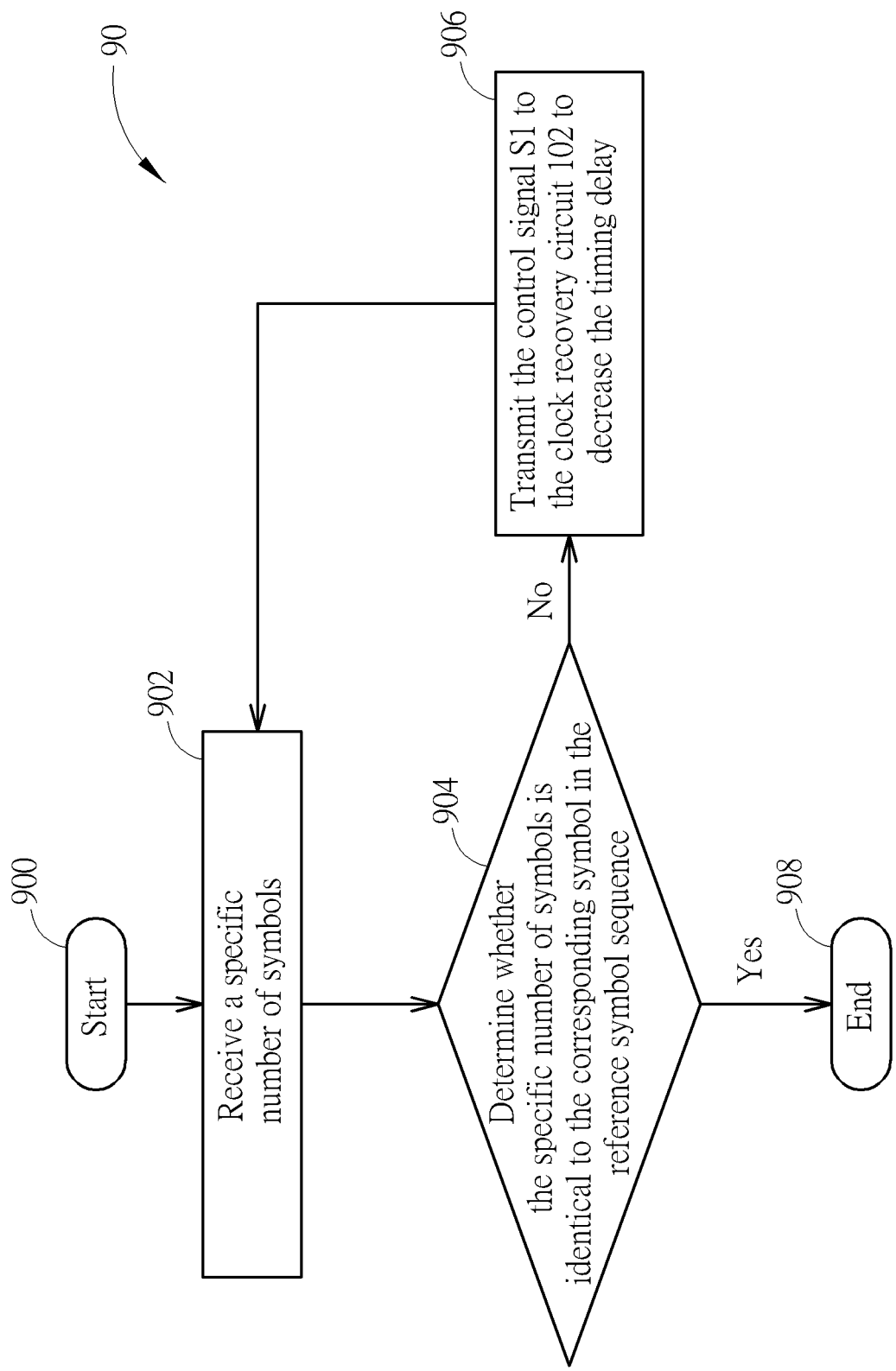
FIG. 9 is a schematic diagram of a process according to an embodiment of the present invention.

The above operations of determining the timing delay for clock recovery may be summarized into a process 90, as shown in FIG. 9. The process 90, which may be implemented in the determination unit 106 of the slave device 10 shown in FIG. 1, includes the following steps:
Step 900: Start.
Step 902: Receive a specific number of symbols.
Step 904: Determine whether the specific number of symbols is identical to the corresponding symbol in the reference symbol sequence. If yes, go to Step 908; otherwise, go to Step 906.
Step 906: Transmit the control signal S1 to the clock recovery circuit 102 to decrease the timing delay. Then go to Step 902.
Step 908: End.

In another embodiment, the timing delay may be configured to a middle value initially, and the determination unit 106 may increase or decrease the timing delay from the middle value to find out a proper value of the timing delay or a proper range of values of the timing delay. It is noted that the number of determination results for determining to apply the present timing delay may be different from the number of determination results for determining to adjust (increase or decrease) the timing delay. For example, the clock recovery circuit 102 may use a present timing delay to generate the clock signal for receiving packet data only if the determination unit 106 determines that consecutive three symbols are all correctly received, and the clock recovery circuit 102 may use an increased timing delay to generate the clock signal if a second one of consecutive five symbols is determined to be wrong even though the first received symbol and the third to the fifth received symbols are determined to be correct.

In another embodiment, the determination flow of finding out the proper timing delay for generating the clock signal CLK may be performed every time when the high-speed transmission starts. This is because the time length of encoding jitter may vary due to variations of supply voltage, temperature and/or process parameters. In such a situation, the preferable or optimal value of the timing delay may also vary. Therefore, the clock recovery circuit 102 is ensured to find out the clock signal having a proper pulse width for receiving packet data.

Figure 6:
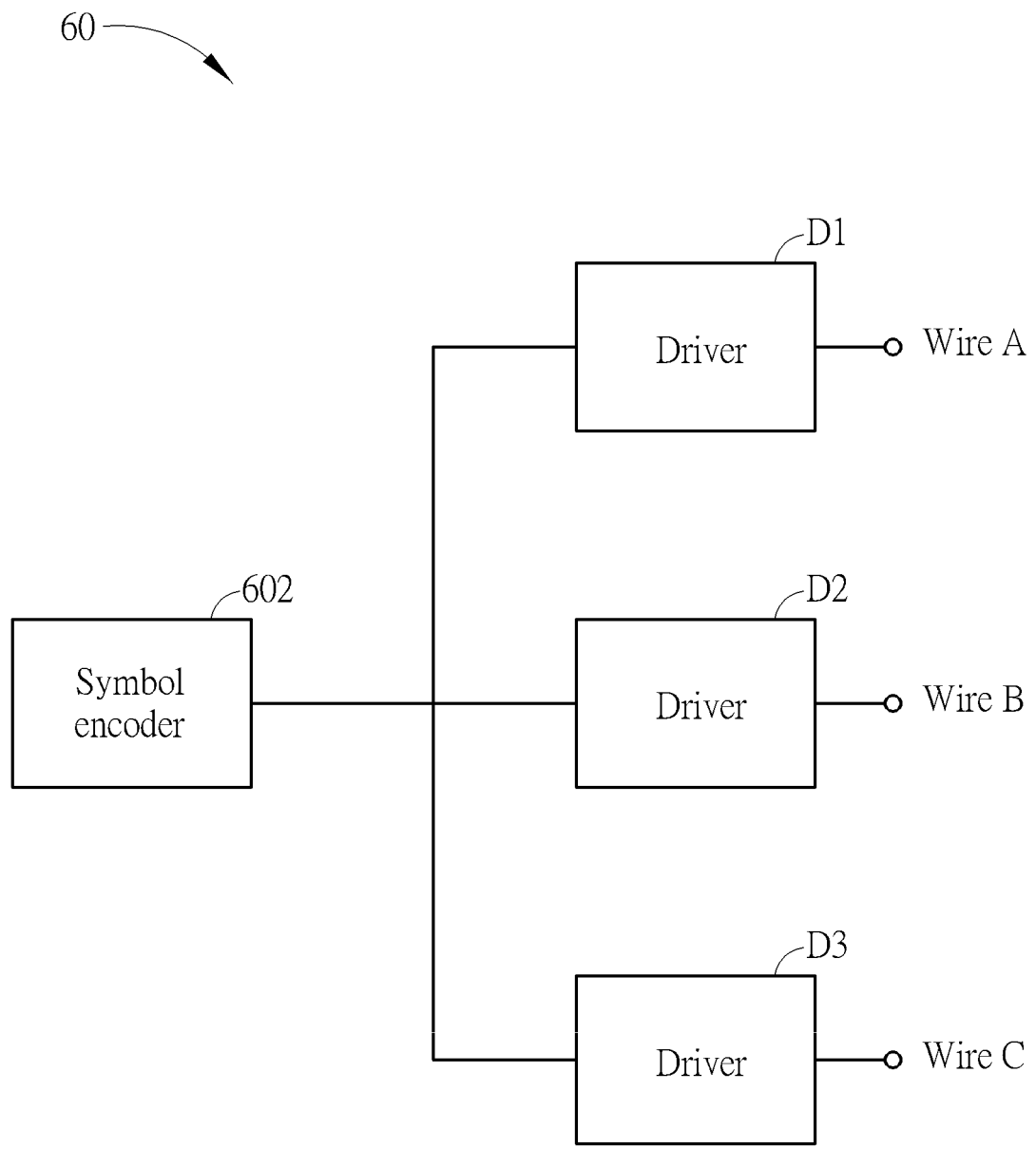
FIG. 6 is a schematic diagram of a master device having a MIPI interface according to an embodiment of the present invention.

Please note that the structure of the MIPI master device 60 shown in FIG. 6 and the MIPI slave device 10 shown in FIG. 1 are only one of various possible implementations of the present invention. For example, the latch circuit for latching differential output signals from the receivers may be implemented apart from the symbol decoder. In the MIPI slave device, the clock signal generated by the clock recovery circuit may be exactly used as the clock signal for latching symbol/packet data; and alternatively, the clock signal generated by the clock recovery circuit may be processed to generate a different clock signal. For example, the MIPI slave device may further include a clock gating cell, which may be used for generating a clock signal with a period 2T (which can latch data at rising edge and falling edge) based on the clock signal with a period T generated by the clock recovery circuit. In this example, the clock gating cell is implemented as a frequency dividing circuit.

Figure 10:
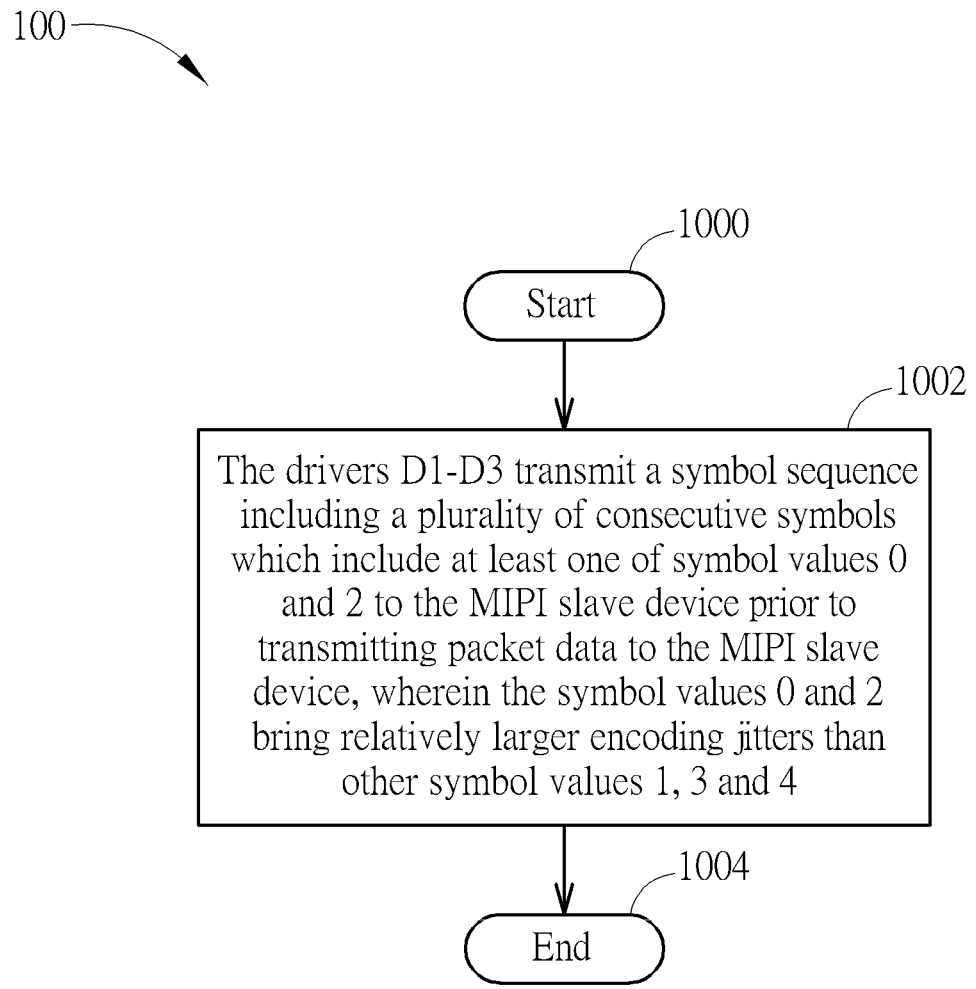
FIG. 10 is a schematic diagram of a process for MIPI master device according to an embodiment of the present invention.

The above operations of the MIPI master device may be summarized into a process 100, as shown in FIG. 10. The process 100, which may be used in the master device 60 shown in FIG. 6, includes the following steps:
Step 1000: Start.
Step 1002: The drivers D1-D3 transmit a symbol sequence including a plurality of consecutive symbols which include at least one of symbol values 0 and 2 to the MIPI slave device prior to transmitting packet data to the MIPI slave device, wherein the symbol values 0 and 2 bring relatively larger encoding jitters than other symbol values 1, 3 and 4.
Step 1004: End.

Figure 11:
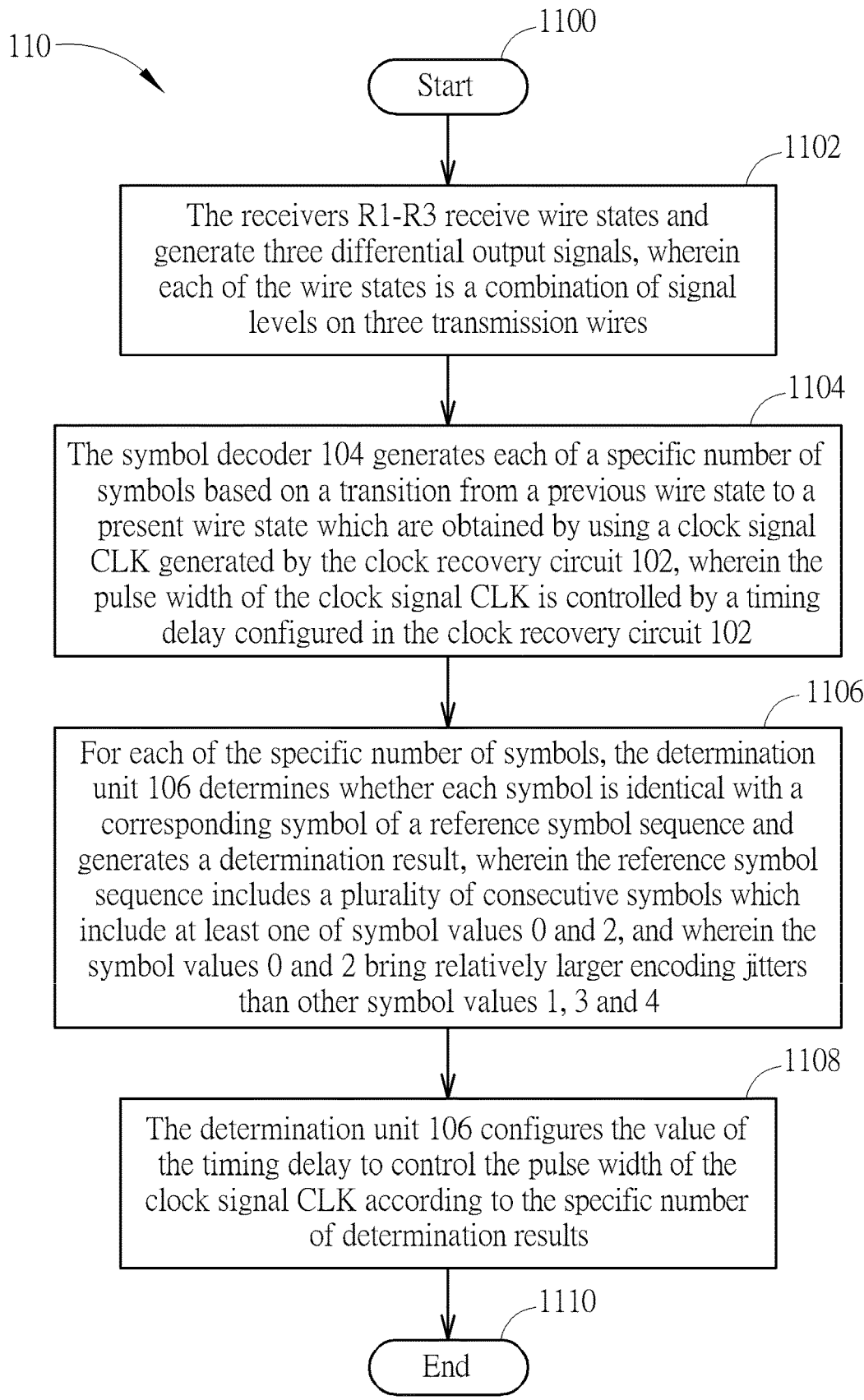
FIG. 11 is a schematic diagram of a process for MIPI slave device according to an embodiment of the present invention.

The above operations of the MIPI slave device may be summarized into a process 110, as shown in FIG. 11. The process 110, which may be used in the slave device 10 shown in FIG. 1, includes the following steps:
Step 1100: Start.
Step 1102: The receivers R1-R3 receive wire states and generate three differential output signals, wherein each of the wire states is a combination of signal levels on three transmission wires.
Step 1104: The symbol decoder 104 generates each of a specific number of symbols based on a transition from a previous wire state to a present wire state which are obtained by using a clock signal CLK generated by the clock recovery circuit 102, wherein the pulse width of the clock signal CLK is controlled by a timing delay configured in the clock recovery circuit 102.
Step 1106: For each of the specific number of symbols, the determination unit 106 determines whether each symbol is identical with a corresponding symbol of a reference symbol sequence and generates a determination result, wherein the reference symbol sequence includes a plurality of consecutive symbols which include at least one of symbol values 0 and 2, and wherein the symbol values 0 and 2 bring relatively larger encoding jitters than other symbol values 1, 3 and 4.
Step 1108: The determination unit 106 configures the value of the timing delay to control the pulse width of the clock signal CLK according to the specific number of determination results.
Step 1110: End.

The detailed operations and alternations of the processes 100 and 110 are illustrated in the above description, and will not be narrated hereinafter.

To sum up, the embodiments of the present invention provides a method of improving clock recovery for the MIPI C-PHY interface and related MIPI master device and MIPI slave device. The MIPI master device may transmit a symbol sequence prior to transmitting packet data to the MIPI slave device, where the symbol sequence includes symbol values 0 and/or 2, for generating a relatively larger encoding jitter than other symbol values. The MIPI slave device may configure and adjust the timing delay for controlling the pulse width of the clock signal by receiving the symbol sequence having the larger encoding jitter. A proper timing delay for controlling the pulse width of the clock signal that may filter out the encoding jitter will be obtained. Therefore, the MIPI slave device may apply the proper timing delay in the clock recovery circuit, allowing the clock recovery circuit to generate the clock signal for receiving the packet data. As a result, the packet data may be correctly received using the correct clock signal where the influences of encoding jitter may be eliminated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a Mobile Industry Processor Interface (MIPI) slave device for improving clock recovery, the method comprising:
   receiving a wire state and generating three differential output signals, wherein the wire state is a combination of signal levels on three transmission wires;
   generating each of a first number of symbols based on a transition from a previous wire state to a present wire state which are obtained by using a clock signal generated by a clock recovery circuit of the MIPI slave device, wherein the pulse width of the clock signal is controlled by a timing delay configured in the clock recovery circuit;
   for each of the first number of symbols, determining whether each symbol is identical with a corresponding symbol of a reference symbol sequence and generating a determination result, wherein the reference symbol sequence comprises a plurality of consecutive symbols, wherein the consecutive symbols are configured to have at least one of a first symbol value and a second symbol value which causes larger encoding jitters than other symbol values; and
   configuring, according to the first number of determination results, the value of the timing delay to control the pulse width of the clock signal;
   wherein the first number of symbols are generated prior to receiving of packet data.

2. The method of claim 1, wherein the step of configuring the value of the timing delay to control the pulse width of the clock signal according to the first number of determination results comprises:
   increasing the timing delay applied to control the pulse width of the clock signal when the first number of determination results indicate a need to adjust the pulse width of the clock signal.

3. The method of claim 2, wherein the timing delay is initially configured to be the smallest value.

4. The method of claim 1, wherein the step of configuring the value of the timing delay to control the pulse width of the clock signal according to the first number of determination results comprises:
   decreasing the timing delay applied to control the pulse width of the clock signal when the first number of determination results indicate a need to adjust the pulse width of the clock signal.

5. The method of claim 4, wherein the timing delay is initially configured to be the largest value.

6. The method of claim 1, wherein the step of configuring the value of the timing delay to control the pulse width of the clock signal according to the first number of determination results comprises:
   determining that a present value of the timing delay is proper to control the pulse width of the clock signal for receiving packet data, when the first number of determination results indicate no need to adjust the pulse width of the clock signal.

7. The method of claim 1, further comprising:
   adjusting the timing delay applied to control the pulse width of the clock signal even when the first number of determination results indicate no need to adjust the pulse width of the clock signal, until a second number of determination results corresponding to the latest received consecutive symbols indicate a need to adjust the pulse width of the clock signal.

8. The method of claim 7, further comprising:
   selecting one of a plurality of values of the timing delay obtained by the adjusting step to control the pulse width of the clock signal for receiving packet data.

9. The method of claim 1, wherein each symbol of the reference symbol sequence has a 3-bit symbol value and the reference symbol sequence comprises three consecutive symbols of symbol value 2, three consecutive symbols of symbol value 0, or a combination of the three consecutive symbols of symbol value 2 and the three consecutive symbols of symbol value 0.

10. The method of claim 9, wherein a symbol of symbol value 4 is between a first set of three consecutive symbols of symbol value 2 and a second set of three consecutive symbols of symbol value 2, and another symbol of symbol value 4 is between a first set of three consecutive symbols of symbol value 0 and a second set of three consecutive symbols of symbol value 0.

11. A Mobile Industry Processor Interface (MIPI) slave device, comprising:
   a plurality of receivers, for receiving a wire state and generating three differential output signals, wherein the wire state is a combination of signal levels on three transmission wires;
   a symbol decoder, for generating each of a first number of symbols based on a transition from a previous wire state to a present wire state which are obtained by using a clock signal generated by a clock recovery circuit of the MIPI slave device, wherein the pulse width of the clock signal is controlled by a timing delay configured in the clock recovery circuit; and
   a determination unit, for determining whether each of the first number of symbols is identical with a corresponding symbol of a reference symbol sequence and generating a determination result, and configuring the value of the timing delay to control the pulse width of the clock signal according to the first number of determination results;
   wherein the reference symbol sequence comprises a plurality of consecutive symbols, wherein the consecutive symbols are configured to have at least one of a first symbol value and a second symbol value which causes larger encoding jitters than other symbol values;

wherein the first number of symbols are generated prior to receiving of packet data.

12. The MIPI slave device of claim 11, wherein the determination unit increases the timing delay applied to control the pulse width of the clock signal when the first number of determination results indicate a need to adjust the pulse width of the clock signal.

13. The MIPI slave device of claim 12, wherein the timing delay is initially configured to be the smallest value.

14. The MIPI slave device of claim 11, wherein the determination unit decreases the timing delay applied to control the pulse width of the clock signal when the first number of determination results indicate a need to adjust the pulse width of the clock signal.

15. The MIPI slave device of claim 14, wherein the timing delay is initially configured to be the largest value.

16. The MIPI slave device of claim 11, wherein the determination unit determines that a present value of the timing delay is proper to control the pulse width of the clock signal for receiving packet data, when the first number of determination results indicate no need to adjust the pulse width of the clock signal.

17. The MIPI slave device of claim 11, wherein the determination unit further adjusts the timing delay applied to control the pulse width of the clock signal even when the first number of determination results indicate no need to adjust the pulse width of the clock signal, until a second number of determination results corresponding to the latest received consecutive symbols indicate a need to adjust the pulse width of the clock signal.

18. The MIPI slave device of claim 17, wherein the clock recovery circuit selects one of a plurality of values of the timing delay obtained by the adjusting operation of the determination unit to control the pulse width of the clock signal for receiving packet data.

19. The MIPI slave device of claim 11, wherein each symbol of the reference symbol sequence has a 3-bit symbol value and the reference symbol sequence comprises three consecutive symbols of symbol value 2, three consecutive symbols of symbol value 0, or a combination of the three consecutive symbols of symbol value 2 and the three consecutive symbols of symbol value 0.

20. The MIPI slave device of claim 19, wherein a symbol of symbol value 4 is between a first set of three consecutive symbols of symbol value 2 and a second set of three consecutive symbols of symbol value 2, and another symbol of symbol value 4 is between a first set of three consecutive symbols of symbol value 0 and a second set of three consecutive symbols of symbol value 0.

* * * * *